J. ROWLAND.
COMBINATION BABY CARRIAGE AND SLEIGH.
APPLICATION FILED NOV. 26, 1918.

1,353,071. Patented Sept. 14, 1920.
2 SHEETS—SHEET 1.

Witnesses
E. R. Ruppert

Inventor
John Rowland
By Victor J. Evans
Attorney

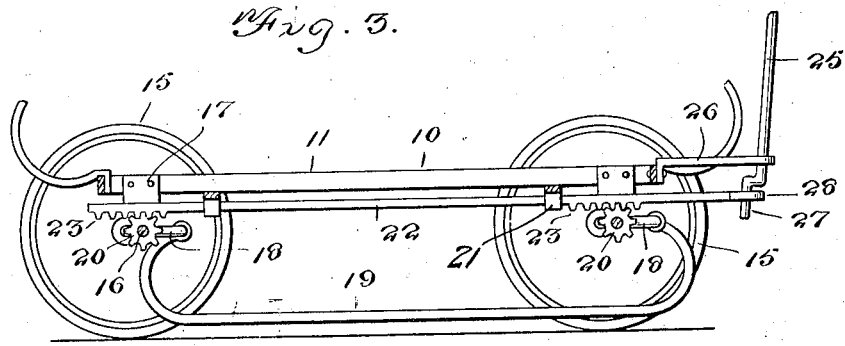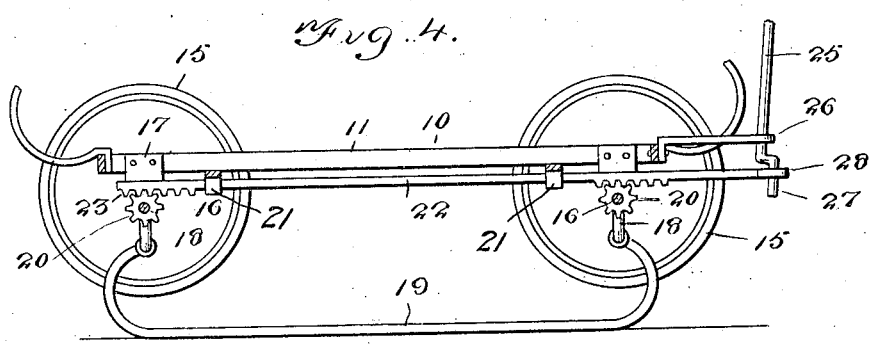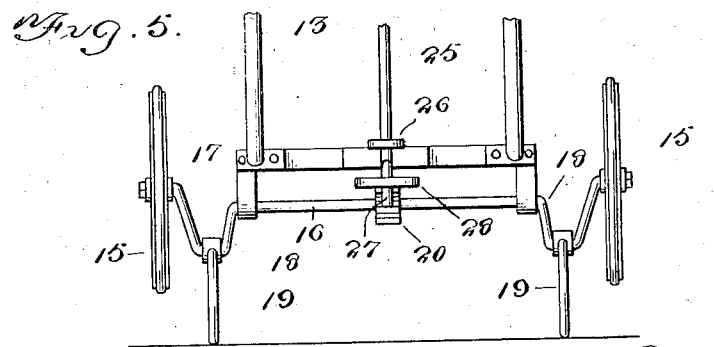

UNITED STATES PATENT OFFICE.

JOHN ROWLAND, OF REPUBLIC, WASHINGTON.

COMBINATION BABY-CARRIAGE AND SLEIGH.

1,353,071. Specification of Letters Patent. Patented Sept. 14, 1920.

Application filed November 26, 1918. Serial No. 264,207.

*To all whom it may concern:*

Be it known that I, JOHN ROWLAND, a citizen of the United States, residing at Republic, in the county of Ferry and State of Washington, have invented new and useful Improvements in Combination Baby-Carriages and Sleighs, of which the following is a specification.

This invention relates to baby carriages and aims to provide a carriage which may be easily and quickly converted into a sleigh.

To this end the invention contemplates mounting the wheels of the carriage upon axles capable of a rocking movement and provided with offset crank portions and runners secured to the latter portions, so that by rocking the axles either the wheels or runners may be brought into contact with the ground.

In addition the invention includes novel means for rocking the axles, said means including pinions mounted upon the axles and engageable by racks carried by a longitudinal movable bar which is disposed centrally of the carriage and operated by a handle or lever mounted upon the handle of the carriage, a crank and slot connection between the lever and racks providing for a longitudinal movement of the latter to operate the pinions to rock the axles and means for locking the posts in position.

In the drawings:

Fig. 3 is a longitudinal sectional view with the parts in the position shown in Fig. 1.

Fig. 4 is a similar view showing the runners in use.

Fig. 5 is a rear elevation of the same, and

Figure 1:
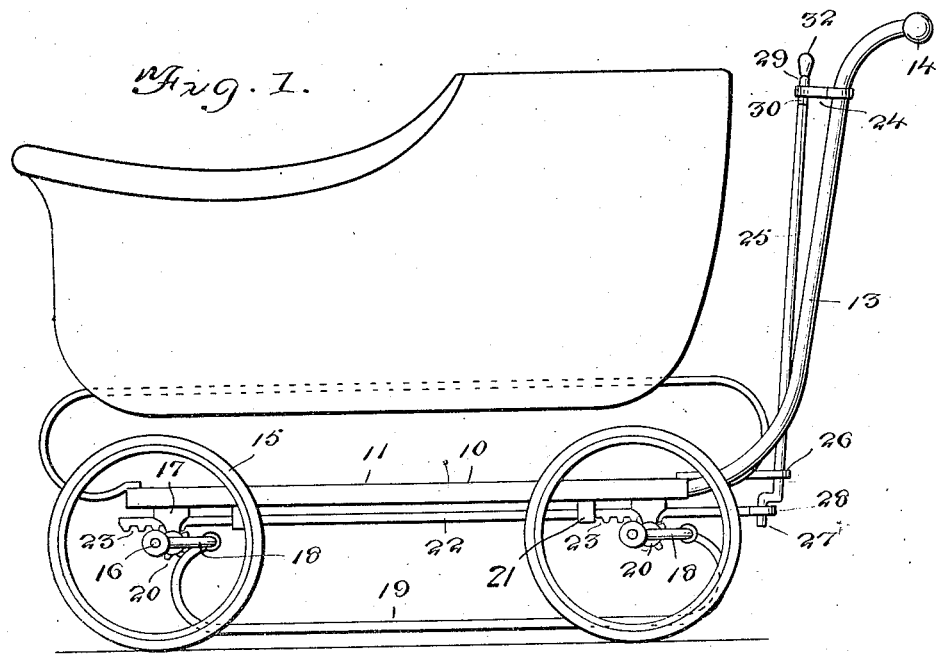
Figure 1 is a side elevation of the running gear of a baby carriage or perambulator constructed in accordance with the invention, the wheels being shown in use.

Referring to the drawings in detail, wherein like characters of reference denote corresponding parts, the numeral 10 designates the frame of the carriage which includes the side bars 11 terminating in upwardly curved portions 13, which together with the transverse handle bar 14 form the usual handle of the carriage.

The axles upon which the wheels 15 are mounted for rotation are in the form of crank shafts 16, the latter being mounted in suitable bearings 17 secured to the under side of the side bars 11. The crank shafts 16 are provided with offset or crank portions 18, the latter being disposed upon each side of the frame 10, preferably between said frame and the wheels 15. Rotatably mounted within the offset or crank portions 18 of the shaft 16 are runners 19, the arrangement of the crank portions 18 being such as to raise the runners above the surface of the ground when the wheels 15 are in use and by rocking the shaft 16 a sufficient distance to raise the wheels 15 above the surface of the ground when the runners 19 are in use, thereby converting the carriage into a sleigh or vice versa.

In order to easily and quickly accomplish this, each of the rock shafts 16 has secured thereon a pinion 20 and mounted for engagement with these pinions in suitable bearings provided in a bracket or hanger 21, is a longitudinally movable bar 22. This bar is provided adjacent each end with rack teeth 23 which are engaged with the teeth of the pinions 20, so that a movement of the bar will rotate the pinions to rock the shafts 16.

Mounted in the bearings in bar 24 secured transversely of the upwardly curved portions 13 of the handle, is rod 25, the lower end of this rod being mounted in a bearing 26, extending rearwardly from the frame 10. The lower end of the rod 25 terminates in an offset portion to provide a crank arm 27, which is adapted to operate within a loop or link 28, projecting rearwardly from and connected to the rack bearing 22. The upper end of the rod 25 is provided with a crank handle 29 which terminates in a downwardly extending portion 30, for engagement with either one of a pair of openings 31 provided in the bar 24.

Figure 2:
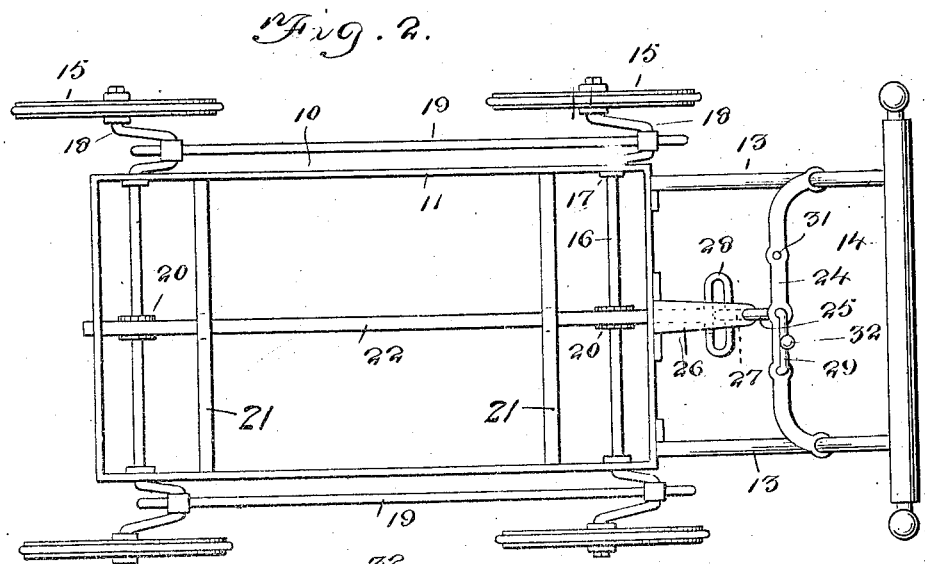
Fig. 2 is a top plan view of the same.
Figure 6:
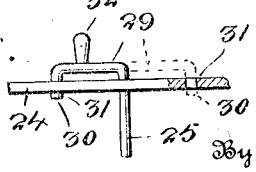
Fig. 6 is a detail view of the locking means.

When the parts are in position shown in Figs. 1 and 2, the wheels will be in contact with the ground for use as a perambulator. For converting the perambulator into a sleigh the rod 25 is raised slightly by means of the handle 32, to disengage the portion 30 from one of the openings 31. A half rotation of the rod 25 will, through its crank connection with the loop 28 serve to move the bar 22 rearward, lower the runners and raise the wheels. The extremity 30 may then be engaged with the opposite opening 31 and the parts locked in this position. It is, of course, apparent that the rearward movement of the rack bar 22 will rock the shaft 16 to lower the cranks 18 while the forward movement of the bar will produce an upward movement of the cranks and a corresponding raising of the runners and the lowering of the wheels.

The invention is susceptible of various changes in its form, proportions and minor details of construction, and the right to make such changes as properly fall within the scope of the appended claims is herein reserved.

Having described the invention, what is claimed is:

1. A perambulator including a frame, transversely disposed rock shafts thereon, wheels mounted for rotation upon each of said shafts, cranks included in the shafts, runners carried by said cranks, pinions carried by the rock shafts, a longitudinally movable rack bar engageable with the pinions, a rock shaft mounted upon the handle, and a crank and slot connection between the rack bar and the handle supported rock shaft, whereby the former may be moved longitudinally of the perambulator by a rotary motion of the latter.

2. A perambulator including a frame, transversely disposed rock shafts thereon, wheels mounted for rotation upon each of said shafts, cranks included in the shafts, runners carried by said cranks, pinions mounted upon the rock shafts, a longitudinally movable rack bar engageable with the pinions and slidable in bearings carried by the frame, a rod rotatably supported upon the perambulator, a transversely disposed loop carried by the longitudinally movable rack bar, and a crank formed on said rod and engageable in said loop to move the rack bar and operate the pinions.

In testimony whereof I affix my signature.

JOHN ROWLAND.